US008694020B2

(12) United States Patent
Guo et al.

(10) Patent No.: US 8,694,020 B2
(45) Date of Patent: Apr. 8, 2014

(54) WIRELESS SENSOR BASED CAMERA LOCATION AND ORIENTATION

(75) Inventors: Yang Guo, Plainsboro, NJ (US); Saurabh Mathur, Bangalore (IN); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 329 days.

(21) Appl. No.: 12/448,887

(22) PCT Filed: Jan. 19, 2007

(86) PCT No.: PCT/US2007/001336
§ 371 (c)(1), (2), (4) Date: Jul. 13, 2009

(87) PCT Pub. No.: WO2008/088332
PCT Pub. Date: Jul. 24, 2008

(65) Prior Publication Data

US 2010/0081452 A1 Apr. 1, 2010

(51) Int. Cl.
*H04W 88/02* (2009.01)

(52) U.S. Cl.
USPC .......... 455/456.1

(58) Field of Classification Search
USPC .......... 455/456.1, 457; 345/156, 158, 179; 382/106; 341/20; 348/207.99; 700/90; 710/1
See application file for complete search history.

(56) References Cited

U.S. PATENT DOCUMENTS

| | | | | |
|---|---|---|---|---|
| 7,721,231 | B2 * | 5/2010 | Wilson | 715/863 |
| 2003/0008671 | A1 * | 1/2003 | Lundgren et al. | 455/456 |
| 2004/0056779 | A1 * | 3/2004 | Rast | 340/985 |
| 2007/0146372 | A1 * | 6/2007 | Gee et al. | 345/474 |
| 2010/0195872 | A1 * | 8/2010 | Velardo et al. | 382/106 |

OTHER PUBLICATIONS

King et al., "COMPASS: A Probabilistic Indoor Positioning System Based on 802.11 and Digital Compasses," WiNTECH'06, Sep. 29, 2006, Los Angeles, California, USA, 7 pages.

Lee et al., "Activity and Location Recognition Using Wearable Sensors," Pervasive Computing, IEEE, vol. 1, Issue 3, Jul.-Sep. 2002, pp. 24-32.

NMS Project, The Cricket Indoor Location System: An NMS Project @ MIT CSAIL, M.I.T. Computer Science and Artificial Intelligence Laboratory, Cambridge, MA, Mar. 13, 2006, pp. 1-7, http://cricket.csail.mit.edu.

Priyantha et al., "The Cricket Location-Support System," 6$^{th}$ ACM Int'l. Conference on Mobile Computing and Networking, Boston, MA, Aug. 2000, 12 pages.

International Search Report, dated Sep. 27, 2007.

* cited by examiner

*Primary Examiner* — Diane Mizrahi
(74) *Attorney, Agent, or Firm* — Robert D. Shedd; Robert B. Levy

(57) ABSTRACT

An apparatus a receiver for a camera for signal communication with transmitters in known locations for determining location of the camera, a compass for the camera for determining orientation of the camera, and a device for determining time associated with the determined camera location and orientation.

19 Claims, 2 Drawing Sheets

WIRELESS SENSOR BASED CAMERA LOCATION AND ORIENTATION

This application claims the benefit, under 35 U.S.C. §365 of International Application PCT/US2007/001336, filed Jan. 19, 2007, which was published in accordance with PCT Article 21(2) on Jul. 24, 2008 in English.

FIELD OF THE INVENTION

The present invention generally relates to wireless sensor based location and more particularly to wireless sensor based camera location and orientation.

BACKGROUND OF THE INVENTION

There are several existing systems that provide a camera position and orientation information. Free-D camera tracking system is developed by the British Broadcasting Co. BBC research and development R&D. It uses a number of markers placed out-of-shot, for example on the ceiling of a studio, that are viewed by a small auxiliary camera mounted on the side of each normal camera. The markers are composed of a number of concentric white and black rings forming a type of barcode, each marker has a unique code number. A serial digital video signal from the auxiliary camera is analyzed by a purpose-built hardware unit to calculate the precise position and orientation of the camera in real time.

Bluei puts out a product line that uses another technique that can acquire position information. It is a high-resolution camera-based tracking system that can be mounted to any movable device, for example a studio dolly, and reads a floor covering that is digitally encoded with a specially designed pattern. The floor pattern has been designed and tested to be bluescreen compatible, thereby allowing the system to be used unobtrusively within virtual reality studios.

Although the Global Positioning System GPS can also be used to globally locate the position of the camera, it would not be accurate enough for the requirements of a virtual studio. Products providing orientation information are available from Vinten and Radamec. Also FreeD provides the orientation of the camera, too.

The current location and orientation techniques are expensive, require tedious and daily system calibration. They cannot be easily extended to support other applications that are not possible with Free-D. For instance, the same framework cannot be used to acquire other information such as temperature, humidity, or vibration. Accordingly, there is a need for a camera location and orientation systems that overcomes the cost and operating disadvantages of existing systems.

SUMMARY OF THE INVENTION

An apparatus includes a receiver for a camera for signal communication with transmitters in known locations for determining location of the camera, a compass for the camera for determining orientation of the camera, and a device for determining time associated with the determined camera location and orientation. Preferably, determining camera location is done by determining the location by a receiver associated with the camera communicating with a transmitter positioned at a known location. A compass is employed determining orientation of the camera and a device communicating with a GPS or cellular network is employed for determining the time. The location, orientation and time for the camera is wirelessly transmitted for constructing trajectory and movement of the camera.

In further aspect of the invention, a method includes determining camera location and orientation information, determining time coincident with the camera orientation and location information, and gathering the determined camera location information, camera orientation and time for wireless transmission.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The position and the orientation information of camera are important meta-data information for the purpose of post-processing such as Visual special effects (VSF). The invention is directed to a wireless sensor network that can automatically pick up the camera position and orientation information as well time information, and wirelessly transmit the data to the back-end server. The devices for implementing the invention are small enough so that they can be attached to the camera. Compared to existing solutions, the invention is less costly and can be easily extended to support other applications. For instance, the same framework can be used to acquire other information such as temperature, humidity, or vibration. The inventive orientation and location system can reduce and simplify the system calibration.

Figure 1:
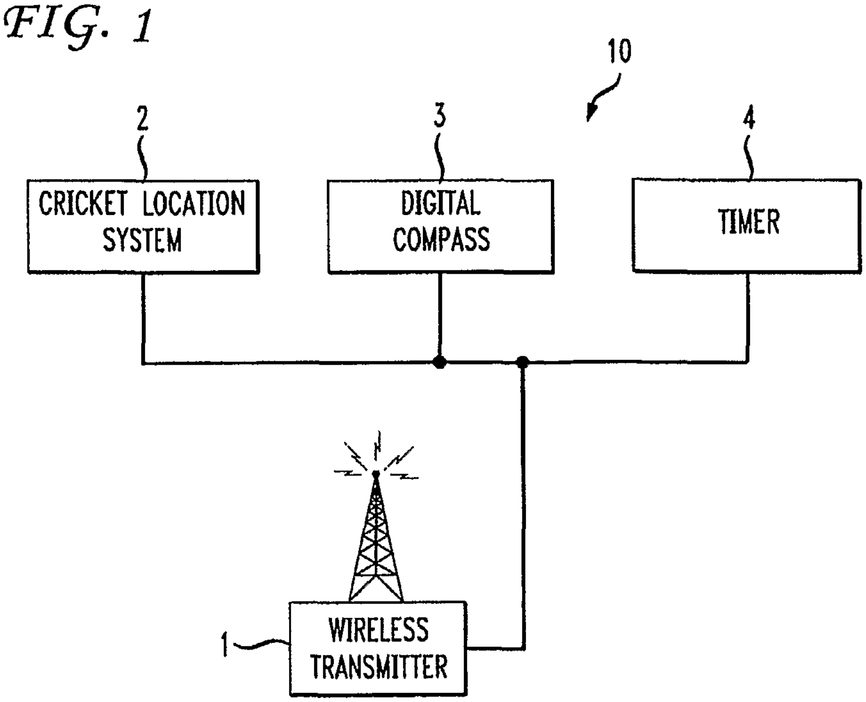
FIG. 1 and FIG. 2 are diagrams that together depict an exemplary architecture of a wireless sensor based system that can record the position, orientation and time information of a camera in accordance with the invention.
Figure 2:
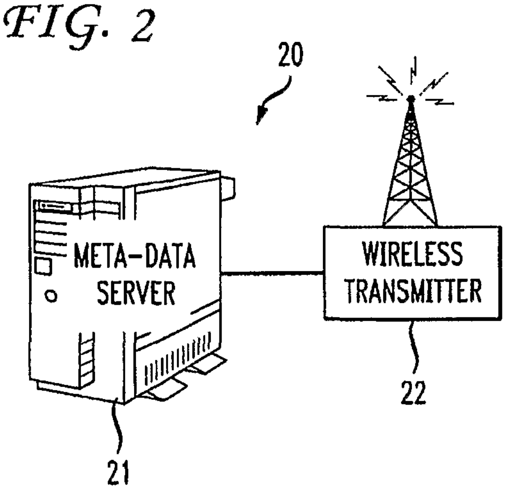

Referring to the diagrams 10,20 of FIGS. 1 and 2, there is shown an exemplary architecture of the inventive wireless sensor technique for determining the position, orientation and time information of a camera.

Referring to FIG. 1 specifically, four devices 1,2,3,4 are attached at the camera: a Cricket location system 2 for generating camera location information, a digital compass 3 for providing camera orientation information, a timer 4 for providing current time and a wireless transmitter 1 that transmits the collected information to a backend server, such as a meta-data server.

The Cricket location system 2 can provide fine-grained location information to applications running on various devices such as handhelds, laptops, and sensor nodes. This data can range from space identifiers (e.g., room numbers), to position coordinates, to compass-like orientation. Cricket is intended for use indoors or in urban areas where the Global Positioning System (GPS) does not work well. Cricket uses a combination of radio frequency (RF) and ultrasound technologies. Wall mounted and/or ceiling mounted beacons placed throughout a building publish information on a radio frequency RF channel. With each radio frequency RF chip or signal transmission the beacon sends a concurrent ultrasonic pulse. Receivers attached to mobile devices listen for the radio frequency RF signals, and after receiving the first few bits, listen for the corresponding ultrasonic pulse. Cricket calculates distance estimates between devices with receivers and nearby beacons by running algorithms based on the difference in propagation speeds between radio frequency RF (light) and ultrasound (sound).

A wireless transmitter 1,22 is attached to the backend of a meta-data server 21, as shown in FIG. 2. The received position and orientation information are processed and stored into the meta-data database on the server 21.

Figure 3:
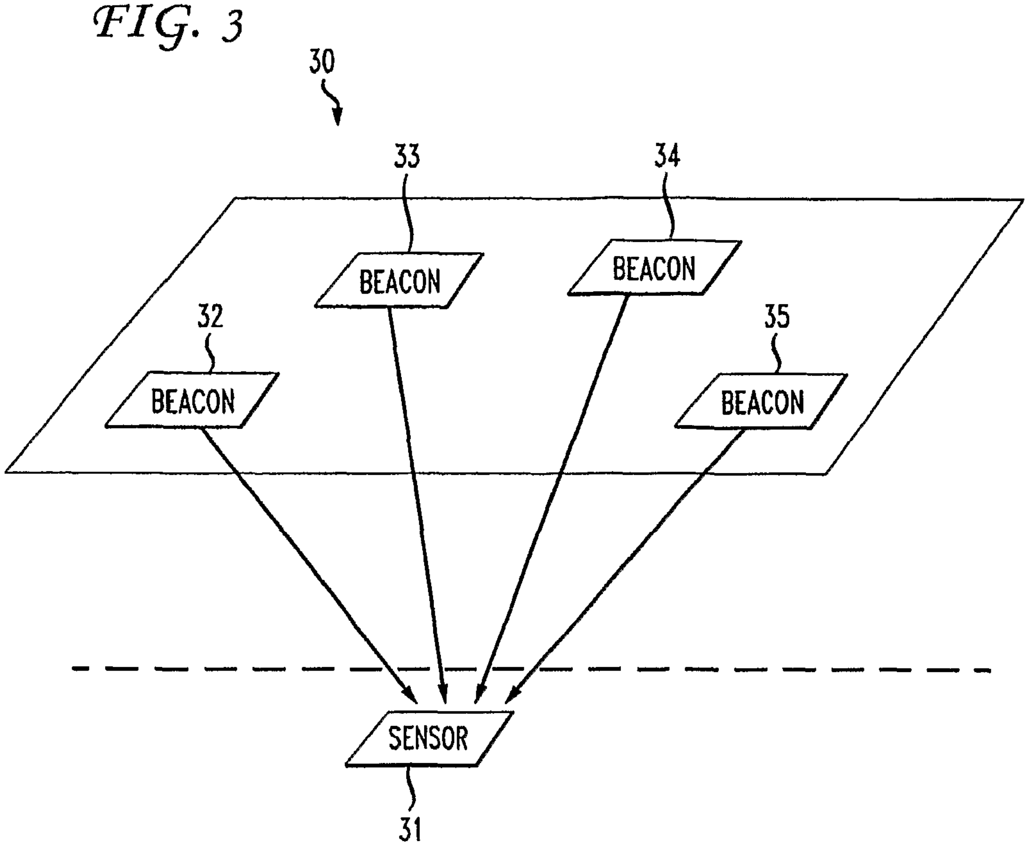
FIG. 3 is a diagram of an exemplary arrangement of sensor locations arrangement for use with the invention.

The location sensor, preferably a Cricket based location sensor system, 2 provides the camera position information. As shown by the diagram 30 in FIG. 3, a set of beacons 32,33,34,35 are installed in the ceiling or other places in a room. Another sensor 31 is attached with camera (not shown). The camera position can be computed using this location system.

Orientation information is gathered by use of a digital compass 3 to offer camera heading information. Combining the location system with the digital compass allows constructing the camera's moving trajectory and to which direction it is moving to shoot or record the movie.

Time information can be gathered several ways, including using a Global position System GPS receiver or a special receiver to get the time information from cellular towers, as done by cellular phones.

A wireless transmitter 1 as shown in FIG. 1 can be added to transmit the obtained location, orientation and time information in real time to a backend server, such as a meta-data server 21. The server 22 can be linked wirelessly through a transmitter 22 in communication with the wireless transmitter 1 on the camera.

Having described a preferred embodiment for accurate wireless based camera location and orientation, it is noted that modifications and variations can be made by persons skilled in the art in light of the above teachings. Having thus described the invention with the details and particularity required by the patent laws, what is claimed and desired protected by Letters Patent is set forth in the appended claims.

The invention claimed is:

1. A method of producing metadata for post-processing in a production process of a motion picture, the method comprising steps of:

providing a camera operative to record video content representing the motion picture, and to move in a plurality of different directions while recording the video content and shooting the motion picture;

determining location, orientation and corresponding time information for the camera in response to the movement of the camera while recording the video content and shooting the motion picture;

gathering the determined location, orientation and corresponding time information for the camera as the metadata for the recorded video content; and wirelessly transmitting the metadata from a wireless transmitter associated with the camera to an external device for the post-processing.

2. The method of claim 1, wherein the step of determining camera location further comprises receiving signals from transmitters around the camera.

3. The method of claim 1, wherein the step of determining camera location comprises determining the location by a receiver associated with the camera communicating with transmitters positioned at known locations.

4. The method of claim 1, wherein the step of determining camera orientation comprises determining camera heading information from a compass associated with the camera.

5. The method of claim 1, wherein the step of determining camera location comprises calculating distance estimates between a receiver mounted on the camera and nearby beacons that are part of a location system using a combination of radio frequency and ultrasound technologies.

6. The method of claim 1, wherein the step of determining time comprises determining time information from communication with one of a global position system and cellular network.

7. The method of claim 1, wherein the external device is a metadata server operative to perform the post-processing with the metadata as part of the production process.

8. An apparatus operative to provide metadata for post-processing in a production process of a motion picture, the apparatus comprising:

a receiver for a camera, the receiver being operative to provide signal communication with transmitters in known locations for determining location of the camera as the camera is moved to record video content representing the motion picture;

a compass for the camera, the compass being operative to determine orientation of the camera as the camera is moved to record the video content while shooting the motion picture; and a device for determining time associated with the determined camera location and orientation as the camera is moved to record the video content while shooting the motion picture; and wherein data representing the determined location, orientation and time of the camera is gathered to represent the metadata for the recorded video content, and the metadata is wirelessly transmitted to an external device for the post-processing.

9. The apparatus of claim 8, wherein the receiver, compass and device for determining time are responsive to movement by the camera to provide the camera's moving trajectory and which direction the camera is moving.

10. The apparatus of claim 8, further comprising a transmitter associated with the camera, the transmitter being operative to wirelessly transmit the metadata to the external device.

11. The apparatus of claim 8, wherein the receiver is a component of a location system using a combination of radio frequency and ultrasound technologies.

12. The apparatus of claim 8, wherein the compass is a digital compass.

13. The apparatus of claim 8, wherein the receiver is responsive to signals from beacons at known locations.

14. The apparatus of claim 8, wherein the device for determining time communicates with one of a cellular network and a Global Positioning System.

15. The apparatus of claim 8, further comprising a transmitter operative to wirelessly transmit changes in the determined location, orientation and time for movement of the camera to a remote location for determining a moving trajectory and direction of the camera.

16. The apparatus of claim 8, wherein the external device is a metadata server operative to perform the post-processing with the metadata as part of the production process.

17. A camera operative to provide metadata for post-processing in a production process of a motion picture, the camera comprising:

a receiver operative to provide signal communication with transmitters in known locations for determining location of the camera as the camera is moved to record video content representative of the motion picture;

a compass operative to determine orientation of the camera as the camera is moved to record the video content and shoot the motion picture; and a device operative to determine time associated with the determined camera location and orientation as the camera is moved to record the video content and shoot the motion picture; and wherein data representing determined location, orientation and time of the camera is gathered to represent the metadata for the recorded video content, and the metadata is wirelessly transmitted from the camera to an external device for the post-processing.

18. The camera of claim 17, wherein the external device is a metadata server operative to perform the post-processing with the metadata as part of the production process.

19. The camera of claim 17, wherein the receiver, compass and device are responsive to movement by the camera to provide the camera's moving trajectory and which direction the camera is moving.

* * * * *